UNITED STATES PATENT OFFICE.

PAUL AUBE, OF PARIS, FRANCE.

METHOD OF MANUFACTURING STEEL.

SPECIFICATION forming part of Letters Patent No. 246,861, dated September 13, 1881.

Application filed March 29, 1881. (No specimens.) Patented in France February 14, 1881.

*To all whom it may concern:*

Be it known that I, PAUL AUBE, of Paris, in the Republic of France, have invented a new and useful Method of Manufacturing Steel, (for which I have obtained a patent in France bearing date February 14, 1881,) of which the following is a specification.

My invention has for its object to convert iron into steel, or inferior sorts of steel into fine steel.

This process can be carried out in various ways, which I am now going to describe in detail.

*First method.*—Iron (by this term I wish to comprise hereinafter articles made of iron and inferior sorts of steel) is placed in a retort, the latter closed and heated to red heat. When the retort, as well as its contents, has attained cherry-heat some fatty matter is introduced into a recess or cavity provided at the bottom of the retort and there decomposed by the heat of the retort. Hydrocarbon gases are thereby formed and the red-hot iron absorbs in its open pores some carbon and nitrogen. Thus, while the continued decomposition of fatty matter produces an abundance of gas, the iron is subjected to cementation. If the iron is pure, which occurs but rarely, nothing else need be placed in the retort; but if the iron is not pure a small quantity of lime or baric carbonate is added to the contents of the retort, in order to fix the sulphur that the iron may contain, or any other substance may be added which produces the same effects as lime or baric carbonate. In case the fatty matter used contains but little nitrogen some impure ammonia, such as can be obtained in the market at a low price, may be added to it, in order to obtain the quantity of nitrogen necessary for producing a good steel. The addition of ammonia has no detrimental effect on the quality of the gas produced in the retort. Some water may also be added to the fatty substance, the oxygen set free by its decomposition serving to burn a part of the carbon contained in the iron, while the hydrogen unites also with carbon and forms hydrocarbon gas.

*Second method.*—It consists, like the first, in introducing iron into the retort, and adding, when required, some lime or baric carbonate, or any other substance which is known to have the effect above described; but coke or charcoal, or both, are also added, and subsequently, when the fatty matter is introduced, and simultaneously with the same, a current of dry steam is admitted into the retort. This method has for its object to increase the quantity of gas which is produced during the cementation of the iron. Because the decomposition of steam is more rapid than that of water, the production of combustible gas will evidently go on with greater speed.

*Third method.*—It consists in placing in a retort coal with or without lime or baric carbonate. Coal contains hydrogen and ammonia, which constituents are favorable for a rapid cementation. Consequently the cementation of the iron is obtained while manufacturing coal-gas, and without further cost than placing the iron in the retort.

*Fourth method.*—It consists in placing in a gas-retort either dried peat mixed with more or less coal, in pieces or in the shape of powder, or dried peat imbibed with any fatty substance, or wood or cork imbibed in the same manner, or coal and peat (or cork) imbibed with fatty matter, or a mixture of two or three of the raw materials named. The gas produced by the dry distillation or decomposition of these materials has a lighting power in proportion with the quantity of fatty matter absorbed. In this case it is necessary to add some ammonia, in order to increase the quantity of nitrogen according to the nature of the fatty matter employed, and while the production of lighting gas is going on the article placed in the retort is subjected to cementation. Wood or coal tar may also be placed in the retort without any prejudice to the cementation, and a superior quality of coke is thus obtained, after the decomposition of the peat, bark, and coal placed in the retort.

I have found by experience that bricks or cakes made from dried peat imbibed with fatty matter, coal-dust, and tar produce an excellent gas and a complete cemetation of the iron. The same results are obtained by replacing the peat by cork-waste steeped in some fatty matter and unfit for other purposes.

Articles of iron or steel which have not the quantity of carbon required for use can be cemented by one of the described methods more or less, according to the time during which the article is left in the retort, and which may be chosen so as to cement the article to one-quarter, one-half, or any portion of its thickness that may be desired. Supposing, however, the cementation to extend to the whole thickness of the article, it is never uniform throughout the whole mass, although the difference of homogenity may be but slight.

I have found by experience that any article previously cemented to one-third, one-half, or any other portion of its mass, can be made completely homogeneous by subjecting it to a current of dry hydrogen, which causes the cementation to spread uniformly over the whole mass of the article. It is therefore possible to give to the article the exact quantity of carbon necessary for the quality of steel to be produced.

My process of manufacturing steel from ordinary wrought-iron, based on this principle, is as follows: I take ordinary wrought-iron, place it in a retort, and subject it to cementation for several hours by one of the processes described at the beginning of this specification, the cementation being carried on rapidly, but not to the whole depth of the article, and without taking care for the uniform distribution of carbon. After the steel obtained by incomplete cementation has cooled down I dip it into an acid-bath and place it in a varnished retort, which is then heated to a temperature of 600° to 700° centigrade. At this temperature I introduce into the interior of the retort a current of dry hydrogen. After some hours I take out the steel, in which the carbon is found to be uniformly distributed over the whole mass. Steel thus obtained and subsequently hammered is preferable to cast-steel.

The same process is applicable to ingots of Bessemer steel, in which the carbon is generally badly distributed. For instance, if mild Bessemer steel, having too little carbon, is to be converted into fine steel, I place it in a retort and produce gas by one of the processes described, thereby fixing on the ingot a certain quantity of carbon. After pickling I place it in a retort and operate as above described.

The distributing process is further applicable to malleable or ordinary cast-iron, in which, after the incomplete decarburation by oxide of iron, there is an excess of carbon in the center instead of at the surface. I place these pieces, after the pickling process, in a retort and subject them to a current of dry hydrogen at the temperature above stated, whereby the carbon is uniformly distributed over the whole mass.

The distributing process is applicable to armor-plates, gun-barrels, or, in short, to any piece of carbureted iron, for the purpose of more evenly distributing the carbon. Steel produced or treated in this manner is superior to ordinary steel, because the hydrogen employed effects not only the uniform distribution of the carbon, but removes a great part of the metalloids, such as sulphur, arsenic, and phosphorus.

Instead of coal, peat, or cork I may use lignite or bituminous shale as raw material for the manufacture of gas; and by the term "fatty matter" I wish to include petroleum, vegetable oils, oleaginous grains, all sorts of tar, residues of any fatty matter, grease, human excrements, grease-water or soap-water, resins, naphtaline, or any other hydrocarbon oils.

What I claim is—

The method of cementing iron which consists in subjecting the iron to heat in a retort in company with substances, as described, which under heat develop hydrocarbon gas and nitrogen with or without carbonaceous matter, as described, the subjecting the metal to an acid-bath, and, finally, at the described temperature, to dry hydrocarbon gas, substantially as and for the purpose set forth.

In testimony whereof I have signed this specification in the presence of two subscribing witnesses.

PAUL AUBE.

Witnesses:
 HUGH MARION,
 P. GIRARD.